United States Patent [19]

Di Biase et al.

[11] Patent Number: 5,171,461
[45] Date of Patent: Dec. 15, 1992

[54] SULFUR AND COPPER-CONTAINING LUBRICANT COMPOSITIONS

[75] Inventors: Stephen A. Di Biase; Kirk E. Davis, both of Euclid, Ohio

[73] Assignee: The Lubrizol Corporation, Wickliffe, Ohio

[21] Appl. No.: 379,309

[22] Filed: Jul. 13, 1989

Related U.S. Application Data

[63] Continuation of Ser. No. 37,759, Apr. 13, 1987, abandoned.

[51] Int. Cl.$^5$ ............................................. C10M 105/72
[52] U.S. Cl. .................................... 252/46.4; 252/47; 252/47.5; 252/48.2; 252/48.6
[58] Field of Search ............... 252/47, 464, 47.5, 39, 252/32.7 E, 482, 486

[56] References Cited

U.S. PATENT DOCUMENTS

| | | | |
|---|---|---|---|
| 2,343,756 | 3/1944 | Downing | 252/37 |
| 2,356,661 | 8/1944 | Downing | 252/37 |
| 2,510,031 | 5/1950 | Folda, Jr. | 252/37.5 |
| 2,552,570 | 5/1951 | McNab et al. | 252/32.7 |
| 2,580,695 | 1/1952 | Niederhauser | 260/601 |
| 2,737,525 | 3/1956 | Mulvaney et al. | 260/481 |
| 2,813,076 | 11/1957 | Edelman | 252/32.7 E |
| 3,296,137 | 1/1967 | Wiese | 252/48.2 |
| 3,306,908 | 2/1967 | LeSuer | 260/326.3 |
| 3,346,493 | 10/1967 | LeSuer | 252/32.5 |
| 3,347,790 | 10/1967 | Meinhardt | 252/32.5 |
| 4,110,234 | 8/1978 | Loveless et al. | 252/47.5 |
| 4,122,021 | 10/1978 | Loveless et al. | 252/26 |
| 4,155,860 | 5/1979 | Soucy | 252/26 |
| 4,189,388 | 2/1980 | Yaffe et al. | 252/46.7 |
| 4,469,609 | 9/1984 | Bandlish et al. | 252/19 |
| 4,519,925 | 5/1985 | Smith | 252/48.6 |
| 4,623,473 | 11/1986 | Davis et al. | 252/33.6 |

FOREIGN PATENT DOCUMENTS 2056482A 3/1981 United Kingdom .

*Primary Examiner*—Margaret Medley
*Attorney, Agent, or Firm*—Joseph P. Fischer; James L. Cordek; Frederick D. Hunter

[57] ABSTRACT

Copper and sulfur containing compositions, and additive concentrates and lubricating compositions containing the copper and sulfur containing compositions are described. The sulfur compounds have the formula:

$$Y-R_1(S)_n-R_2Y^1 \qquad (I)$$

wherein one member of the group Y and $Y^1$ is an electron withdrawing group and the other member is hydrocarbyl or an electron withdrawing group; $R_1$ and $R_2$ are the same or different open chain aliphatic or aromatic hydrocarbyl groups; and n is a number from 1 to about 8. The copper is present as an oil soluble or dispersible source of copper.

17 Claims, No Drawings

SULFUR AND COPPER-CONTAINING LUBRICANT COMPOSITIONS

CROSS-REFERENCE TO RELATED APPLICATIONS

This application is a continuation of co-pending application Ser. No. 07/037,759, filed Apr. 13, 1987 abandoned, the disclosure of which is hereby expressly incorporated in its entirety by reference herein.

This invention relates to sulfur and copper-containing compositions and the use thereof as additives for lubricating oil compositions which have improved anti-wear and anti-oxidant properties. More particularly, the invention relates to lubricating compositions which may be lubricating oils and greases useful in industrial applications and in automotive engines, transmissions and axles. The lubricating compositions of this invention are often of the "low phosphorus" type.

BACKGROUND OF THE INVENTION

Compositions prepared by the sulfurization of various organic materials including olefins are known in the art, and lubricants containing these compositions are also known. U.S. Pat. No. 4,191,659 describes the preparation of sulfurized olefinic compounds by the catalytic reaction of sulfur and hydrogen sulfide with olefinic compounds containing from 3 to 30 carbon atoms. The compounds are reported to be useful in lubricating compositions. U.S. Pat. No. 4,119,549 describes a similar procedure for sulfurizing olefins utilizing sulfur and hydrogen sulfide followed by removal of low boiling materials from said sulfurized material.

Sulfur-containing compositions characterized by the presence of at least one cycloaliphatic group with at least two nuclear carbon atoms of one cycloaliphatic group or two nuclear carbon atoms of different cycloaliphatic groups joined together through a divalent sulfur linkage are described in Reissue Patent Re 27,331. The sulfur linkage contains at least two sulfur atoms, and sulfurized Diels-Alder adducts are illustrative of the compositions disclosed in the reissue patent. The sulfur-containing compositions are useful as extreme pressure and anti-wear additives in various lubricating oils.

Dialdehydes containing disulfide groups and represented by the formula

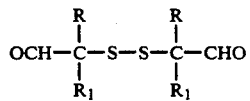

wherein both R groups are the same alkyl groups of 1 to 18 carbon atoms and both $R_1$ groups are the same alkyl or aryl groups are described in U.S. Pat. No. 2,580,695. The compounds are reported to be useful as cross-linking agents and as chemical intermediates.

Lubricating compositions containing sulfides having the formula

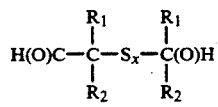

wherein $R_1$ is a hydrocarbon group, $R_2$ is hydrogen or a hydrocarbon group, and x is 1 to 2 are described in U.S. Pat. No. 3,296,137.

U.S. Pat. No. 3,817,928 describes the preparation of hydroxy-terminated polyesters of thia-bis-aldehydes. The derivatives are prepared by reacting a thia-bis-aldehyde with another reagent such as alcohol, organometallic compound or metal base. The derivatives are useful for industrial purposes such as in the preparation of polyurethanes. The thia-bis-aldehydes which are utilized as starting materials in the '928 patent are similar to the thia-bis-aldehydes described in the above-identified U.S. Pat. No. 3,296,137. Hydroxy-acid derivatives of the thia-bis-aldehydes are described as having the formula

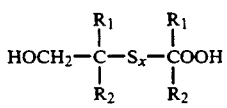

wherein $R_1$, $R_2$ and x are as defined above. The hydroxyacids can be converted to other derivatives such as lactones by intramolecular condensation in the presence of acetic anhydride or to amides by reaction with aqueous ammonia.

U.S. Pat. No. 4,248,723 describes the preparation of acetal and thioacetal derivatives of thia-bis-aldehydes similar to the thia-bis-aldehydes described above. The acetal and thioacetal derivatives are prepared by reacting the thia-bis-aldehydes with compounds represented by the formula

wherein $R_3$ is a $C_{1-18}$ alkyl, $C_{6-18}$ aryl, etc. group, and X is oxygen or sulfur. The acetal derivatives are useful as extreme pressure additives for lubricants.

Copper-containing compositions and the use thereof in lubricating oils are also known. U.S. Pat. No. 2,510,031 relates to an oil-soluble soap of a water-insoluble heavy metal which forms a stable sulfide in combination with a sulfurized composition which has a tendency to evolve $H_2S$. Copper, zinc, chromium, nickel, manganese, etc. are among the salts considered useful in the application. The purpose of this composition is to suppress the evolution of hydrogen sulfide.

Metal-containing complexes formed by reacting a non-acidic, acylated nitrogen-intermediate with certain complex forming metal compounds are described in U.S. Pat. No. 3,306,908. The metals include cadmium, chromium, manganese, iron, cobalt, nickel, copper and zinc. Lubricating compositions comprising the metal complexes are also described.

U.S. Pat. No. 2,552,570 describes hydrocarbon products, generally lubricating oils, containing cuprous salts of various phosphate esters. These compositions may also contain a wide variety of other agents such as detergents, pour depressants, sulfurized fats and the like.

Lubricants which employ a combination of oil-soluble copper compounds with oil-soluble sulfur compounds are described in U.S. Pat. No. 2,343,756. This patent teaches numerous copper and salt compounds.

U.S. Pat. No. 2,356,661 describes lubricating oil compositions which employ from 50–1000 parts of copper in the form of oil-soluble non-ionogenic organic compounds in the presence of a small proportion of sulfur in the form of oil-soluble organic sulfur compounds.

U.K. Patent Application GB 2056482A describes lubricating compositions comprising a base oil containing a specified amount of copper plus a zinc dithiophosphate. Other common lubricating oil additives are also described.

Organophosphorus and metal organophosphorus compounds are used extensively in lubricating oils as extreme pressure agents and anti-wear agents. Recently, environmental and toxicological problems associated with the use of organophosphorus compounds have become a matter of concern. Because of such problems, there is a need to develop lubricant compositions containing reduced levels of phosphorus, yet characterized as having acceptable oxidation inhibition and anti-wear properties. Lubricating compositions containing up to about 0.1% phosphorus are considered low-phosphorus containing compositions. U.S. Pat. No. 4,623,473 describes several low-phosphorus containing lubricating compositions. Each of the above-mentioned patents is hereby incorporated herein by reference for relevant disclosures contained therein.

SUMMARY OF THE INVENTION

This invention is directed to novel compositions which are useful as additives for lubricating oil compositions having improved anti-oxidant and extreme pressure properties. Such compositions have been shown to have particularly beneficial performance compared to prior art compositions. The compositions of this invention are sulfur and copper-containing compositions comprising (A) at least one sulfur compound of the formula

$$Y-R_1(S)_n-R_2Y^1 \qquad (I)$$

wherein one member of the group Y and $Y^1$ is an electron withdrawing group which is not a halogen and the other member is hydrocarbyl or an electron withdrawing group which is not a halogen; $R_1$ and $R_2$ are the same or different open chain aliphatic or aromatic hydrocarbyl groups; and n is a number from 1 to about 8; and (B) an oil soluble or dispersible source of copper.

Frequently, $R_1$ and $R_2$ are each independently groups of the formula $$-C(R_a)(R_b)- \qquad (II)$$

wherein $R_a$ and $R_b$ are each independently H or hydrocarbyl groups. One member of each set of $R_a$ and $R_b$ may be Y or $Y^1$, each set of $R_a$ and $R_b$ together may be alkylene groups containing about 4 to about 7 carbon atoms, and Y and $Y^1$ are each independently —C(X)R, —COOR, —CN, —C(R_3)=NR_4, —CON(R)_2 or —NO_2, and one of Y and $Y^1$ also may be a CH_2OH group, wherein each X is independently O or S, $R_3$ and each R is independently H or a hydrocarbyl group, $R_4$ is H or a hydrocarbyl group;

when both Y and $Y^1$ are —C(R_3)=NR_4, the two $R_4$ groups together may be a hydrocarbylene group linking the two nitrogen atoms; and when Y or $Y^1$ is —CH_2OH and the opposite member $Y^1$ or Y is —COOR, a lactone may be formed by intramolecular combination of Y and $Y^1$.

The compositions of the present invention are useful as additives for lubricating oils. These compositions are particularly useful as additives for low phosphorus lubricating oils.

DETAILED DESCRIPTION OF THE PREFERRED EMBODIMENTS

The compositions of the present invention comprise a mixture of certain sulfur compounds with oil-soluble or dispersible sources of copper. These compositions are useful as additives for lubricating oil and provide improved anti-oxidancy, anti-wear and extreme-pressure properties. They are particularly useful in preparing oils of the low-phosphorus type, i.e., those containing less than about 0.1% by weight of phosphorus.

The term "hydrocarbyl group" is used throughout this specification and in the appended claims to denote a group having at least one carbon atom directly attached to the remainder of the molecule and having predominantly hydrocarbon character within the context of this invention. The expression "hydrocarbyl group" includes, in a general sense, mono- and polyvalent groups. The context in which the term is used will dictate which meaning is appropriate. One skilled in the chemical arts will recognize whether a mono- or polyvalent group is intended. Such groups include the following:

(1) Hydrocarbon groups; that is, aliphatic, (e.g., alkylene, alkyl or alkenyl), alicyclic (e.g., cycloalkyl or cycloalkenyl), aromatic, aliphatic- and alicyclic-substituted aromatic, aromatic-substituted aliphatic and alicyclic groups, and the like, as well as cyclic groups wherein the ring is completed through another portion of the molecule (that is, two indicated substituents may together form a cyclic group). Such groups are known to those skilled in the art; examples include methyl, methylene, hexyl, hexylene, octadecyl, octadecylene, eicosyl, cyclohexyl, phenyl, phenylene, naphthyl and naphthylene (all isomers being included).

(2) Substituted hydrocarbyl groups; that is, groups containing non-hydrocarbon substituents which, in the context of this invention, do not alter the predominantly hydrocarbon character of the group. Those skilled in the art will be aware of suitable substituents (e.g., halo, hydroxy, alkoxy, carbalkoxy, nitro, alkylsulfoxy).

(3) Hetero groups; that is, groups which, while predominantly hydrocarbon in character within the context of this invention, contain atoms other than carbon present in a chain or ring otherwise composed of carbon atoms. Suitable hetero atoms will be apparent to those skilled in the art and include, for example, nitrogen, oxygen and sulfur.

In general, no more than about three substituents or hetero atoms, and preferably no more than one, will be present for each 10 carbon atoms in the hydrocarbyl group.

(A): Sulfur compounds

The compositions of the present invention comprise sulfur compounds characterized by the formula

$$Y-R_1(S)_n-R_2-Y^1 \qquad (I)$$

wherein one member of the group Y and $Y^1$ is an electron withdrawing group which is not a halogen and the other member is hydrocarbyl or an electron withdrawing group which is not a halogen. The electron withdrawing group of the sulfur compounds of the present invention is generally an activating moiety. Illustrative examples include a carbonyl containing group, for example, an aldehyde, an acid, an ester, an amide, a ketone; a thiocarbonyl functional group, a nitrile functional group, a nitro functional group, and combinations thereof. Generally, the sulfur containing compound has two such groups therein. Of these various groups, carbonyl containing groups are preferred. Thus, the above-noted groups generally act as electron withdrawing groups. $R_1$ and $R_2$ are the same or different open chain aliphatic or aromatic hydrocarbyl groups; and n is a number from 1 to about 8.

By open-chain aliphatic is meant that attachment of $R_1$ and $R_2$ to sulfur and to the electron withdrawing group does not take place at a cycloaliphatic carbon atom. $R_1$ and $R_2$ may, however, as described hereinbelow, comprise substituents that are cycloaliphatic. In one embodiment $R_1$ and $R_2$ contain from 3 to about 8 carbon atoms. In a preferred embodiment, $R_1$ and $R_2$ are each independently groups of the formula $$-C(R_a)(R_b)- \quad\quad (II)$$

wherein $R_a$ and $R_b$ are each independently H or hydrocarbyl groups preferably H or lower hydrocarbyl groups containing from 1 to about 7 carbon atoms one member of each set of $R_a$ and $R_b$ may be Y or $Y^1$, each of $R_a$ and $R_b$ together may be alkylene groups containing about 4 to about 7 carbon atoms, and the members of the group Y and $Y^1$ that are electron withdrawing groups are each independently —C(X)R, —COOR, —CN, —C($R_3$)=$NR_4$, —CON(R)$_2$ or —NO$_2$, and one of Y and $Y^1$ also may be a CH$_2$OH group, wherein each X is independently O or S, $R_3$ and each R are independently H or a hydrocarbyl group, $R_4$ is H or a hydrocarbyl group;

when both Y and $Y^1$ are —C($R_3$)=$NR_4$, the two $R_4$ groups together may be a hydrocarbylene group linking the two nitrogen atoms; and when Y or $Y^1$ is —CH$_2$OH and the opposite member $Y^1$ or Y is —COOR, a lactone may be formed by intramolecular combination of Y and $Y^1$.

As can be seen from the above formula, the sulfur compounds utilized in the present invention are characterized by the presence of the thia-bis-alkylene or -arylene structure group:

$$-R_1-(S)_n-R_2$$

wherein $R_1$, $R_2$ and n are as described above. The two terminal valences are satisfied by the Y and $Y^1$ groups specified above.

The thia-bis-alkylene group which characterizes the sulfur compounds utilized in the compositions of this invention is present in, or is derived in many instances from thia-bis-aldehydes. As noted from formula I and in the appended claims, thia-bis-aldehydes are included among the sulfur compounds which may be utilized in the compositions of the present invention. Furthermore, the bis-aldehydes provide, in some instances, the starting material for the other sulfur compounds utilized in the present invention. Thus, in some of the embodiments of the present invention, a thia-bis-aldehyde is the sulfur compound used in the compositions. In other embodiments, a thia-bis-aldehyde is converted to a derivative through the contemporaneous conversion of both aldehyde groups to other terminal groups by chemical reactions with appropriate reagents. In such reactions, the thia group (S)$_n$ and the $R_1$ and $R_2$ groups are inert and remain unchanged in the compound.

$R_1$ and $R_2$ in Formula I are the same or different hydrocarbyl groups. The hydrocarbyl groups may be open chain aliphatic or aromatic groups. Examples are alkylene, aryl-substituted alkylene, phenylene, naphthylene, cycloalkyl-substituted alkylene and the like. $R_1$ and $R_2$ may each independently be groups of the formula $$-C(R_a(R_b)- \quad\quad (II)$$

$R_a$ and $R_b$ are each independently H or hydrocarbyl groups, and one member of each set of $R_a$ and $R_b$ may be Y or $Y^1$.

The hydrocarbyl groups $R_a$ and $R_b$ may be alkyl or aryl groups and usually will contain up to about 30 carbon atoms. Preferably the hydrocarbyl groups are alkyl groups containing up to about 10 carbon atoms. Specific examples of hydrocarbyl groups include linear and branched chain alkyl groups, cycloalkyl groups, aralkyl groups, alkaryl groups, etc. As used in the specification and claims, the term "hydrocarbyl group" is intended to include groups which are substantially hydrocarbon in character. Thus, the hydrocarbyl groups include groups which contain a polar substituent such as chloro, bromo, nitro, ether, etc., provided that the polar substituent is not present in proportions so as to alter significantly the hydrocarbon character of the group. In most instances, there should be no more than one polar substituent in each group, preferably each group is purely hydrocarbyl.

As mentioned above, some of the sulfur compounds of the present invention as represented by the Formula I are thia-bis-aldehydes. That is, Y and $Y^1$ in Formula I are C(O)H groups. Numerous thia-bis-aldehydes compounds are known. Such compounds have been described in, for example, U.S. Pat. Nos. 3,296,137, 2,580,695, 3,414,466 and 3,419,462. Other thia-bis-aldehydes and methods for preparing them are disclosed in Brown and Meth-Cohn, "Tetrahedron Letters" (1974), 46, 4069–4072; "Heterocycles", 15(1), 489–92 (1981); "Chemical Abstracts" 55:2546c; "Chemical Abstracts" 65:5218a and others. Each of these patents and publications is hereby incorporated herein by reference for relevant disclosures contained therein. Many thia-bis-aldehydes are conveniently prepared by the sulfurization of suitable aldehydes. Suitable aldehydes include aromatic aldehydes, ArCHO, wherein Ar is an aromatic hydrocarbon group, and aliphatic aldehydes. Preferred aldehydes are those having the structural formula $$R_aR_bCHC(O)H$$

wherein $R_a$ and $R_b$ are hydrogen or hydrocarbyl groups. The sulfurization of many of these aldehydes can be accomplished by reacting the aldehyde with a sulfur halide such as sulfur monochloride (i.e., S$_2$Cl$_2$), sulfur dichloride, sulfur monobromide and sulfur dibromide. The relative amounts of the aldehyde and the sulfur halide may vary over wide ranges. In most instances, the reaction involves 2 moles of the aldehyde and 1 mole of the sulfur halide. In other instances, an excess of either one of the reactants may be used. When sulfur compounds are desired which contain more than 2 sulfur atoms (e.g., n is an integer from 3–8), these compounds can be obtained by reacting the aldehydes with a mixture of sulfur halide and sulfur flowers.

The reaction of an aldehyde with a sulfur halide may be effected simply by mixing the two reactants at the desired temperature which may range from about −30° C. to about 250° C. or higher. The preferred reaction temperature generally is within the range of from about 10 to about 80° C. The reaction may be carried out in the presence of a diluent or solvent such as benzene, naphtha, hexane, chloroform, mineral oil, etc. The diluent/solvent facilitates the control of the reaction temperature and allows thorough mixing of the reactants.

The aromatic thia-bis-aldehydes can be prepared by the methods disclosed in several of the above-mentioned patents and publications. The above-mentioned patents and publications are each hereby expressly incorporated by reference for relevant disclosures of thia-bis-aldehydes and methods for preparing same.

The thia-bis-aldehydes which can be prepared as described above can be converted to derivatives containing other functional groups which are normally derivable therefrom. Techniques for preparing many such compounds are disclosed in the chemical and patent literature, including U.S. Pat. Nos. 3,817,928, 3,839,438 and 3,920,700. These patents are hereby incorporated herein by reference for relevant disclosures contained therein. For example, the thia-bis-aldehydes can be converted to hydroxy-acid derivatives wherein one of the aldehyde groups is converted to a COOH group, and the other aldehyde group is converted to a $CH_2OH$ group. The hydroxy-acid derivatives are obtainable most conveniently by treating the corresponding thia-bis-aldehyde with an alkaline reagent such as an alkali metal hydroxide or alkaline earth metal hydroxide, preferably a dilute aqueous solution thereof containing from about 5 to about 50% by weight of the hydroxide in water. Such alkaline reagents may be sodium hydroxide, lithium hydroxide, calcium hydroxide, strontium hydroxide, etc. The hydroxy-acid is isolated from the reaction mixture by acidification with a mineral acid such as hydrochloric acid. The hydroxy-acid derivatives of thia-bis-aldehydes can be represented by Formula III below

$$HOCH_2—R^1—(S)_n—R^2—COOH \quad (III)$$

where $R^1$, $R_2$, and n are as previously defined. Specific examples of such hydroxy-acid derivatives include 6-hydroxy-2,2,5,5-tetramethyl-3,4-dithiahexanoic acid; 6-hydroxy-2,2-diethyl-5-propyl-5-butyl-3,4-dithiahexanoic acid; 6-hydroxy-2,2,5,5-tetraethyl-3,4-dithiahexanoic acid; etc.

By virtue of the presence of the hydroxy group and the carboxylic group in the hydroxy-acids described by formula III above, various other sulfur-containing compounds useful in the present invention can be obtained by the conversion of such hydroxy group and/or the carboxylic group to other polar groups normally derivable therefrom. Examples of such derivatives include esters formed by esterification of either or both of the hydroxy group and the carboxylic group; amides, imides, and acyl halides formed through the carboxylic group; and lactones formed through intramolecular cyclization of the hydroxy-acid accompanied with the elimination of water. The procedures for preparing such derivatives are well known to those skilled in the art, and it is not believed necessary to unduly lengthen the specification by including a detailed description of such procedures. More specifically, the carboxylic group (COOH) in Formula III can be converted to ester groups (COOR) and amide groups $(CON(R)_2)$ wherein the R groups may be hydrocarbyl groups containing from 1 to 30 carbon atoms and more generally from 1 to about 10 carbon atoms, and the R groups in the amide group may also be hydrogen. Specific examples of such R groups include ethyl, propyl, butyl, phenyl, etc.

The procedures for preparing lactones through intramolecular cyclization of the hydroxy-acid of formula III accompanied by the elimination of water are well known in the art. Generally, the cyclization is promoted by the presence of materials such as acetic anhydride, and the reaction is effected by heating the mixtures to elevated temperatures such as the reflux temperature while removing volatile materials including water.

The sulfur compounds characterized by structural formula I where Y and/or $Y^1$ are $—C(R_3)=NR_4$  also can be prepared from the corresponding thia-bis-aldehydes and thia-bis-ketones. These mono- and di-imine compounds are prepared by reacting one mole of the di-aldehyde or di-ketone with one or two moles of an amine, respectively. The amines may be monoamines or polyamines. When polyamines are reacted with the thia-bis-aldehydes or thia-bis-ketones $[—C(O)R_5]$, cyclic di-imines can be formed. For example, when both Y and $Y^1$ in formula I are $—C(R_3)=NR_6$, the two $R_4$ groups together may be a hydrocarbylene group linking the two nitrogen atoms. The amines which are reacted with the thia-bis-aldehydes to form the imines may be ammonia or primary amines characterized by the formula $$R_4NH_2$$

wherein $R_4$ is hydrogen, a hydrocarbyl, or an amino hydrocarbyl group. Generally, the hydrocarbyl groups will contain up to about 30 carbon atoms and will more often be aliphatic hydrocarbyl groups containing from 1 to about 10 carbon atoms.

In one preferred embodiment, the hydrocarbyl amines which are useful in preparing the imine salts of the present invention are primary hydrocarbyl amines containing from about 2 to about 30 carbon atoms in the hydrocarbyl group, and more preferably from about 4 to about 20 carbon atoms in the hydrocarbyl group. The hydrocarbyl group may be saturated or unsaturated. Representative examples of primary saturated amines are the lower (e.g., having from 1 to about 7 carbons) alkyl amines and those known as aliphatic primary fatty amines and commercially known as "Armeen" primary amines (product available from Armak Chemicals, Chicago, Ill.).

Also suitable are mixed fatty amines such as Armak's Armeen-C, Armeen-O, Armeen-OL, Armeen-T, Armeen-HT, Armeen S and Armeen SD. Many of these fatty amines contain a high level of unsaturation (e.g., Armeen O is oleyl amine). These Armeen primary amines are available in both distilled and technical grades. While the distilled grade will provide a purer reaction product, the desirable amides, imines and imides will form in reactions with the amines of technical grade.

In another preferred embodiment, the amine derived products of this invention are those derived from tertiary-aliphatic primary amines. Such amines have at least about 4 carbon atoms in the alkyl group, and for the most part, they have a total of less than about 30 carbon atoms in the alkyl group.

Usually the tertiary aliphatic primary amines are monoamines represented by the formula

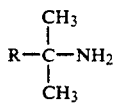

wherein R is a hydrocarbyl group containing from one to about 30 carbon atoms.

Mixtures of tertiary-aliphatic primary amines are also useful for the purposes of this invention. Illustrative of amine mixtures of this type are "Primene 81R" which is a mixture of $C_{11}$–$C_{14}$ tertiary alkyl primary amines and "Primene JM-T" which is a similar mixture of $C_{18}$–$C_{22}$ tertiary alkyl primary amines (both are available from Rohm and Haas Company). The tertiary alkyl primary amines and methods for their preparation are well known to those of ordinary skill in the art and, therefore, further discussion is unnecessary. Tertiary alkyl primary amines useful for the purposes of this invention and methods for their preparation are described in U.S. Pat. No. 2,945,749 which is hereby incorporated by reference for its teaching in this regard.

Primary amines in which the hydrocarbon chain comprises olefinic unsaturation also are useful. Thus, the $R_4$ group may contain one or more olefinic unsaturation depending on the length of the chain, usually no more than one double bond per 10 carbon atoms. Representative amines are dodecenylamine, myristoleylamine, palmitoleylamine, oleylamine and linoleylamine. Such unsaturated amines also are available under the Armeen tradename as discussed hereinbefore.

The thia-bis-aldehydes and thia-bis-ketones also can be reacted with polyamines. Examples of useful polyamines include diamines such as mono- or dialkyl, symmetrical or asymmetrical ethylene diamines, propane diamines (1,2, or 1,3), and polyamine analogs of the above. Suitable fatty polyamines are "Duomeen C" (N-coco-1,3-diaminopropane), "Duomeen S" (N-soya-1,3-diaminopropane), "Duomeen T" (N-tallow-1,3-diaminopropane), or "Duomeen O" (N-oleyl-1,3-diaminopropane). "Duomeens" are commercially available diamines described in Product Data Bulletin No. 7-10R1 of Armak Chemical Co., Chicago, Ill.

The reaction of thia-bis-aldehydes (and ketones) with primary amines or polyamines can be carried out by techniques well known to those skilled in the art. Generally, the thia-bis-aldehyde or ketone is reacted with the amine or polyamine in a hydrocarbon solvent at an elevated temperature, generally in an atmosphere of nitrogen. As the reaction proceeds, the water which is formed is removed such as by distillation.

Sulfur compounds characterized by structural Formula I where Y and $Y^1$ may be C(X)R, COOR, CN and $NO_2$, and $R_1$ and $R_2$ are of the formula —$C(R_a(R_b))$— wherein $R_a$ and $R_b$ are as described hereinabove can be prepared by the reaction of compounds characterized by the structural formula

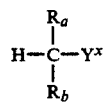
(IV)

wherein $R_a$ and $R_b$ are as defined above, and $Y^x$ is C(X)R, COOR, CN or $NO_2$, or mixtures of different compounds represented by formula IV with a sulfur halide or a mixture of sulfur halides and sulfur flowers. Generally, about one mole of sulfur halide is reacted with two moles of the compounds represented by formula IV. In one embodiment, $R_a$ or $R_b$ also may $Y^x$. In such instances, the sulfur compounds which are formed as a result of the reaction with the sulfur halide will contain four Y groups which may be the same or different depending upon the starting material. For example, when a di-ketone such as 2,4-pentanedione is reacted with sulfur monochloride, the resulting product contains four ketone groups; when the starting material contains a ketone group and an ester group (e.g., ethylacetoacetate), the resulting product contains two ketone groups and two ester groups; and when the starting material contains two ester groups (e.g., diethylmalonate), the product contains four ester groups. Other combinations of functional groups can be introduced into the sulfur products utilized in the present invention and represented by Formula I by selecting various starting materials containing the desired functional groups.

Sulfur compounds represented by Formula I wherein Y and/or $Y^1$ are CN groups can be prepared by the reaction of compounds represented by Formula IV wherein $Y^x$ is CN and $R_a$ and $R_b$ are hydrogen or hydrocarbyl groups. Preferably, $R_a$ is hydrogen and $R_b$ is a hydrocarbyl group. Examples of useful starting materials include, for example, propionitrile, butyronitrile, etc.

Compounds of Formula I wherein Y and $Y^1$ are $NO_2$ groups can be prepared by (1) reacting a nitro hydrocarbon $R^1R_2C(H)NO_2$ with an alkali metal or alkaline earth metal alkoxide to form the salt of the nitro hydrocarbon, and (2) reacting said salt with sulfur monochloride in an inert, anhydrous nonhydroxylic medium to form a bis (1-nitrohydrocarbyl) disulfide. Preferably the nitro hydrocarbon is a primary nitro hydrocarbon ($R_1$ is hydrogen and $R_2$ is hydrocarbyl).

The starting primary nitro compounds used in carrying out this synthesis are well known. Illustrative compounds are nitroethane, 1-nitropropane, 1-nitrobutane, 1-nitro-4-methylhexane, (2-nitroethyl) benzene, etc.

The nature of the alkanol used in obtaining the alkali or alkaline earth metal salt of the starting primary nitro compound is not critical. It is only necessary that it be appropriate for reaction with the metal to form the alkoxide. Because they are easily obtainable and inexpensive, the lower alkanols (i.e., alkanols of 1 to 4 carbon atoms) such as methanol, ethanol and butanol will usually be employed in the synthesis.

The medium in which the salt is reacted with $S_2Cl_2$ must be inert to both the reactants. It is also essential that the medium be anhydrous and nonhydroxylic for the successful formation of the bis(1-nitrohydrocarbyl) disulfides. Examples of suitable media are ether, hexane, benzene, dioxane, higher alkyl ethers, etc.

Temperatures from about 0° to 25° C., preferably 0°–10° C., may be used during the preparation of the metal salt. In the preparation of the bisdisulfide temperatures in the range of −5° to +15° C. may be used. Preferably, temperatures between about 0° to 5° C. are used in this step of the process.

Representative examples of the nitro sulfides are: bis(1-nitro-2-phenylethyl) disulfide, bis(1-nitrodecyl) disulfide, bis(1-nitro-2-phenyldecyl) disulfide, bis(1-nitro-2-cyclohexylethyl) disulfide, bis(1-nitropentadecyl) disulfide, bis(1-nitro-2-naphthylethyl) disulfide, bis(1-nitro-3-p-tolylpropyl) disulfide and the like.

The carboxylic ester-containing sulfur compounds (i.e., Y and/or $Y^1$ is COOR) described above can be utilized to prepare other sulfur compounds useful as component (A) in the present invention. For example, the ester (COOR) can be hydrolyzed to the carboxylic acid (COOH) which can be converted to other esters by reaction with various alcohols or to amides by reaction with various amines, including ammonia, in primary or secondary amines such as those represented by the formula (R)$_2$NH wherein each R is hydrogen or a hydrocarbyl group. These hydrocarbyl groups may contain from 1 to about 30 carbon atoms and more generally will contain from about 1 to 10 carbon atoms.

Numerous patents and publications are mentioned in the above discussions. Each of these patents and publications is expressly incorporated by reference for relevant disclosures contained herein.

The following Examples 1–4 illustrate the preparation of thia-bis-aldehydes useful as component (A) and as intermediates in preparing some of the other sulfur compositions represented by Formula I. Unless otherwise indicated in the examples and elsewhere in this specification and claims, all parts and percentages are by weight, and all temperatures are in degrees Celsius.

EXAMPLE 1

Sulfur monochloride (1620 parts, 12 moles) is charged to a 5-liter flask and warmed under nitrogen to a temperature of about 53° C. whereupon 1766 parts (24.5 moles) of isobutyraldehyde are added dropwise under nitrogen at a temperature of about 53°–60° C. over a period of about 6.5 hours. After the addition of the isobutyraldehyde is completed, the mixture is heated slowly over a period of 6 hours to a temperature of about 100° C. while blowing with nitrogen. The mixture is maintained at 100° C. with nitrogen blowing for a period of about 6 hours and volatile materials are removed from the reaction vessel. The reaction product then is filtered through a filter aid. The filtrate is the desired product containing 31.4% sulfur (theory, 31.08%). The desired reaction product, predominantly 2,2'-dithiodiisobutyraldehyde, is recovered in about 95% yield.

EXAMPLE 2

Sulfur monochloride (405 parts, 3 moles) is charged to a 2-liter flask and warmed to about 50° C. under nitrogen whereupon 769.2 parts (6 moles) of 2-ethylhexanal are added dropwise. After about 45 minutes of addition, the reaction mixture exotherms to about 65° C. The addition of the remaining aldehyde is continued at about 55° C. over a period of about 5 hours. After allowing the mixture to stand overnight, the mixture is heated slowly to 100° C. and maintained at this temperature. Additional 2-ethylhexanal (20 parts) is added, and the mixture is maintained at 100° C. while blowing with nitrogen. The reaction mixture is stripped to 135° C./10 mm. Hg. and filtered through a filter aid. The filtrate is the desired bis-aldehyde containing 19.9% sulfur (theory, 20.09).

EXAMPLE 3

Sulfur dichloride (257.5 parts, 2.5 moles) is charged to a 1-liter flask and warmed to 40° C. under nitrogen whereupon 360.5 parts (5 moles) of isobutyraldehyde are added dropwise while maintaining the reaction temperature at about 40°–45° C. The addition of the isobutyraldehyde requires about 6 hours, and the reaction initially is exothermic. The reaction mixture is maintained at room temperature overnight. After maintaining the reaction mixture at 50° C. for one hour while blowing with nitrogen, the mixture is heated to 100° C. while collecting volatile materials. An additional 72 parts of isobutyraldehyde is added, and the mixture is maintained at 100° C. for 4 hours, stripped, and filtered through a filter aid. The filtrate is the desired bis-aldehydes containing 24% sulfur indicating that the product is a mixture of the mono- and di-sulfide products.

EXAMPLE 4

The procedure of Example 1 is repeated replacing isobutyraldehyde with an equimolar amount of mercaptobenzaldehyde.

EXAMPLE 5

Methanol (500 parts) is charged to a 1-liter flask, and 23 parts (1 mole) of sodium are added slowly in a nitrogen atmosphere. The mixture is cooled in an ice bath to about 5°–10° C. whereupon 89 parts (1 mole) of 1-nitropropane are added dropwise. The reaction mixture is filtered, and the solids are washed with ether, and the slurry is cooled to 0°–5° C. whereupon 67.5 parts (0.5 mole) of sulfur monochloride are added dropwise under nitrogen over a period of about 2.5 hours. An additional 200 parts of ether are added, and the mixture is filtered. The ether layer is washed with ice water and dried over magnesium sulfate. Evaporation of the ether yields the desired product containing 9.24% nitrogen and 38% sulfur.

EXAMPLE 6

Sodium hydroxide (240 parts, 6 moles) is dissolved in water, and the solution is cooled to room temperature whereupon 824 parts (4 moles) of 2,2'-dithiodiisobutyraldehyde prepared as in Example 1 are added over a period of about 0.75 hour. The reaction mixture exotherms to about 53° C., and after stirring for about 3 hours, the reaction mixture is extracted three times with 500 parts of toluene. The aqueous layer is cooled in an ice bath to about 7° C., and 540 parts of concentrated hydrochloric acid are added slowly at a temperature below about 10° C. A white solid forms in the reaction vessel, and the mixture is filtered. The solid is washed with ice water and dried. The solid material is the desired hydroxy-acid product containing 27.1% sulfur (theory, 28.6%).

EXAMPLE 7

Methyl isobutyl ketone (300.6 parts, 3 moles) is charged to a 1-liter flask and heated to 60° C. whereupon 135 parts (1 mole) of sulfur monochloride are added dropwise under nitrogen over a period of about 4 hours. The reaction mixture is maintained at about 60°–70° C. during the addition, and when all of the sulfur monochloride has been added, the material is blown with nitrogen while heating to 105° C. The mixture is maintained at 105°–110° C. for several hours while collecting volatile materials. After stripping to 95° C. at reduced pressure, the reaction mixture is filtered at room temperature through a filter aid and the filtrate is the desired product containing 30.1% sulfur (theory, 24.4%).

EXAMPLE 8

A mixture of 400 parts (4 moles) of 2,4-pentanedione and 800 parts of ethyl acetate is prepared, cooled to 10° C., and 270 parts (2 moles) of sulfur monochloride are added dropwise over a period of 4 hours at about 10°-18° C. The mixture is allowed to stand at room temperature overnight, and after cooling to about 5° C. is filtered. The solid is washed with mineral spirits and air dried. The solid material is the desired product containing 26.3% sulfur (theory, 24.4%).

EXAMPLE 9

A mixture of 390 parts (3 moles) of ethylacetoacetate and 900 parts of ethyl acetate is prepared and cooled to 10° C. whereupon 202.5 parts (1.5 moles) of sulfur monochloride are added dropwise under nitrogen over a period of 3 hours. The temperature of the reaction reaches about 20° C. during the addition. After standing overnight at room temperature, the mixture is cooled to about 7° C. and filtered. The solids are washed with textile spirits and air dried. The solid material is the desired product containing 9.99% sulfur and having a melting point of 104°-108° C.

EXAMPLE 10

A mixture of 650 parts (5 moles) of ethylacetoacetate and 730 parts (5 moles) of Alfol 810, a commercial mixture of alcohols containing from 8 to 10 carbon atoms, is prepared and heated to a temperature of 130° C. while collecting distillate. The temperature is slowly increased to 200° C. as ethanol is distilled. The residue is stripped to 10 mm. Hg./120° C., and the residue is the desired ester product.

A mixture of 1035 parts (4.5 moles) of the ethylacetoacetate/Alfol 810 ester product and 800 parts of ethyl acetate is prepared and cooled to 10° C. whereupon 304 parts (2.25 moles) of sulfur monochloride are added dropwise under nitrogen for a period of about 3 hours while maintaining the reaction temperature between 10°-15° C. After allowing the mixture to stand overnight at room temperature, the mixture is blown with nitrogen and heated to 110° C. while collecting solvent. After stripping to 133° C./70 mm. Hg., the mixture is filtered through a filter aid, and the filtrate is the desired product containing 11.75% sulfur (theory, 12.26%).

EXAMPLE 11

A mixture of 480 parts (3 moles) of diethylmalonate and 800 parts of ethyl acetate is prepared and cooled to 10° C. whereupon 202.5 parts (1.5 moles) of sulfur monochloride are added dropwise under nitrogen at 10°-15° C. over a period of one hour. After allowing the mixture to stand overnight at room temperature, the mixture is heated to reflux to remove most of the solvent. The mixture then is heated to 120° C. while blowing with nitrogen, stripped to a temperature of 130° C./90 mm. Hg., and filtered through a filter aid at room temperature. The filtrate is the desired product containing 15.0% sulfur.

EXAMPLE 12

A mixture of 480 parts (3 moles) of diethylmalonate, 876 parts (6 moles) of Alfol 810 and 3 parts of para-toluenesulfonic acid is prepared and heated to 140° C. as ethanol is distilled. The temperature is slowly increased to 180° C. while removing additional ethanol. A total of 237 parts of ethanol is collected, and 6 parts of sodium bicarbonate is added to the reaction mixture which is then stripped to 130° C. at 10 mm. Hg. The residue is filtered through a filter aid, and the filtrate is the desired ester.

A mixture of 720 parts (2 moles) of the above-prepared diethylmalonate/Alfol 810 ester product and 500 parts of ethyl acetate is prepared and cooled to about 7° C. whereupon 135 parts (1 mole) of sulfur monochloride are added dropwise under nitrogen over a period of about 2 hours while maintaining the reaction mixture at 7°-12° C. The solution is allowed to stand at room temperature overnight, warmed to reflux for 3 hours, and blown with nitrogen while heating to a temperature of about 140° C. to remove solvent. The mixture then is stripped to 140° C. at reduced pressure and filtered at room temperature. The filtrate is the desired product containing 7.51% sulfur.

EXAMPLE 13

The procedure of Example 1 is repeated replacing isobutyraldehyde with an equimolar amount of methylisobutryate.

EXAMPLE 14

A mixture of 310 parts (4.3 moles) of 1,2-diaminopropane and 1200 parts of water is prepared and cooled to room temperature whereupon 412 parts (2 moles) of the bis-aldehyde product prepared in Example 1 are added. The temperature of the mixture reaches 40° C. whereupon solids begin to form. The slurry is maintained at room temperature for about 4 hours and filtered. The solid is washed with water, dried and recovered. The solid is the desired product containing 10.1% nitrogen and 25.7% sulfur. The crude product melts at about 106°-112° C. and the product recrystallized from a methanol/ethanol mixture has a melting point of 114°-116° C.

EXAMPLE 15

A mixture of 291 parts (1.3 moles) of the hydroxy monoacid prepared in Example 6, 156 parts (2.6 moles) of normal propanol, 100 parts of toluene and 2 parts of para-toluenesulfonic acid is prepared and heated to the reflux temperature while removing water. After water elimination begins to slow down, an additional one part of the para-toluenesulfonic acid is added, and the refluxing is continued while collecting additional water. Sodium bicarbonate (5 parts) is added and the mixture is stripped at atmospheric pressure to a temperature of 100° C., and thereafter under reduced pressure to 120° C. The residue is filtered at room temperature through a filter aid, and the filtrate is the desired product containing 24.4% sulfur (theory, 24%).

EXAMPLE 16

A mixture of 448 parts (2 moles) of the hydroxy monoacid prepared as in Example 6, and 306 parts (3 moles) of acetic anhydride is prepared, heated to about 135° C. and maintained at this temperature for about 6 hours. The mixture is cooled to room temperature, filtered, and the filtrate is stripped at reduced pressure to 150° C. The residue is filtered while hot, and the filtrate is the desired lactone containing 29.2% sulfur (theory, 31%).

EXAMPLE 17

A mixture of 412 parts (2 moles) of the dithia-bis-aldehyde prepared in Example 1 and 150 parts of toluene is prepared and heated to 80° C. whereupon 382 parts (2 moles) of Primene 81R are added dropwise while blowing with nitrogen at a temperature of 80°-90° C. A water azeotrope is removed during the addition of the Primene 81R, and after the addition is completed, the temperature is raised to 110° C. while removing additional azeotrope. The residue is stripped at reduced pressure to 105° C. and filtered at room temperature through a filter aid. The filtrate is the desired product containing 16.9% sulfur (theory, 16.88%) and 3.64% nitrogen (theory, 3.69%).

EXAMPLE 18

The general procedure of Example 17 is repeated except that only 206 parts of the thia-bis-aldehyde of Example 1 is utilized in the reaction.

EXMAPLE 19

The procedure of Example 17 is repeated except that the bis-aldehyde of Example 1 is replaced by an equivalent amount of the bis-aldehyde of Example 2.

EXAMPLE 20

The procedure of Example 17 is repeated except that the bis-aldehyde of Example 1 is replaced by an equivalent amount of the bis-aldehyde of Example 3.

(B) Source of Copper

The compositions of this invention also include at least one oil soluble or dispersible source of copper. Sources of copper include elemental copper, copper bonded ionically (e.g., salts) and copper coordination compounds. Also contemplated as useful sources of copper are compounds wherein copper is bonded both ionically and via coordinate covalent bonds. These mixed ionic/covalent compounds include those wherein a single copper is bonded by both ionic and coordinate covalent bonds, and compounds having more than one copper wherein at least one is bonded ionically and another is bonded covalently.

Ionic copper compounds include a carboxylate, a dithiocarbamate, a sulfonate, a salt of a mono- or dithiophosphoric acid, a phenate or a xanthante.

Examples of copper coordinates compounds include those where the coordination compound is formed by coordination with copper through a sulfur or nitrogen containing ligand.

By oil soluble or dispersible is meant that an amount effective to provide the desired level of performance can be dissolved, dispersed or suspended in the lubricating compositions of this invention. Usually, this means that the additive can be used at least about 0.001% by weight in the finished lubricating oil composition.

The sources of copper useful in this invention may be inorganic or organic. It is important that the source of copper be in a form that is oil soluble or dispersible. Any oxidation state of copper, e.g., copper$^O$, copper(I), copper(II), etc. may be used. Useful sources of copper include elemental copper, inorganic copper compounds such as halides, oxides, hydroxides, nitrates and organic copper compounds. Elemental copper in the form of powder, dust or flakes is useful. Inorganic copper compounds include copper oxides, nitrates, sulfides and the like. Organic copper compounds include copper salts of fatty acids, copper dithiocarbamates, copper dialkyldithiophosphates, and the like. Sources of copper useful in the composition of this invention are well known. Useful sources of copper are described in U.S. Patents.

2,343,756
2,356,661
2,987,410
3,346,493
3,507,789
4,122,021
4,155,860
4,623,473

Each of these patents is hereby expressly incorporated by reference for relevant disclosures contained therein. Other sources of oil soluble or dispersible copper will occur to one skilled in the art.

Components A and B are present in relative amounts effective as additives for lubricating oils. Typically the weight ratio of A:B ranges from about 1:99 to about 99:1, more often from about 1:20 to about 50:1, preferably about 1:2 to about 10:1. Frequently the amount of sulfur and/or copper present in the components dictates the amount of each to be used. Also, in some cases components A and B can be the same. For example, a sulfur containing material can be reacted with a copper containing reagent to provide a product containing both sulfur and copper.

The compositions of this invention may contain other components. In a preferred embodiment, the compositions further comprise a zinc salt of a dithiophosphoric acid. Zinc salts of dithiophosphoric acids are often referred to as zinc dithiophosphates, zinc 0,0-dihydrocarbyl dithiophosphates, and other commonly used names. They are sometimes referred to by the abbreviation ZDP. The zinc salt of a dithiophosphoric acid may be present in a minor amount to provide additional extreme pressure, anti-wear and anti-oxidancy performance. When the composition contains phosphorus, zinc dithiophosphate together with copper dithiophosphate, if present, usually contributes the major amount of phosphorus. Preferably, zinc dithiophosphate, together with copper dithiophosphate, if present, contributes all or nearly all the phosphorus which is present. When zinc dithiophosphate is present in a lubricating composition, it is often used in an amount that provides up to about 0.25% by weight phosphorus to the finished lubricating oil composition. Preferably, whenever zinc dithiophosphate is present, it will be in an amount that provides up to about 0.1% by weight phosphorus, preferably from about 0.03 to about 0.09% by weight phosphorus. Zinc dithiophosphates are very well known in the art, and there is no need to discuss the types of zinc dithiophosphates available or methods for making them.

As mentioned hereinabove, other additives are contemplated for use in the compositions of this invention. In addition to zinc salts of dithiophosphoric acids discussed hereinabove, such additives are those normally used in lubricating oils, such as for example, detergents, dispersants, oxidation inhibiting agents, pour point depressing agents, extreme pressure agents, anti-wear agents, color stabilizers and anti-foam agents.

Auxiliary extreme pressure agents and corrosion and oxidation inhibiting agents which may be included in the compositions of the invention are exemplified by chlorinated aliphatic hydrocarbons such as chlorinated wax, organic sulfides and polysulfides such as benzyldisulfide, bis(chlorobenzyl)disulfide, dibutyltetrasulfide, sulfurized alkylphenol, sulfurized dipentene, and sulfurized terpenes. Also contemplated are phosphorus esters including principally dihydrocarbon and trihydrocarbon phosphites such as dibutylphosphite, diheptylphosphite, distearylphosphite, and the like.

Viscosity improvers (also sometimes referred to as viscosity index improvers) are additives which improve the viscosity-temperature characteristics of oils. Such additives are often included in the compositions of this invention. Viscosity improvers are usually polymers, including polyisobutenes, polymethacrylic acid esters, diene polymers, polyalkyl styrenes, and polyolefins. Multifunctional viscosity improvers which also have dispersant and/or antioxidancy properties are known. Such products are described in numerous publications including Dieter Klamann, "Lubricants and Related Products", Verlag Chemie Gmbh (1984), pp 185-193; C. V. Smalheer and R. K. Smith, "Lubricant Additives", Lezius-Hiles Co (1967); M. W. Ranney, "Lubricant Additives", Noyes Data Corp. (1973), pp 92-145; M. W. Ranney, "Lubricant Additives, Recent Developments", Noyes Data Corp (1978), pp 139-164; and M. W. Ranney, "Synthetic Oils and Additives for Lubricants", Noyes Data Corp. (1980), pp 96-166. Each of these publications is hereby expressly incorporated by reference.

Pour point depressants are a particularly useful type of additive often included in the lubricating oils described herein. The use of such pour point depressants and oil-based compositions to improve low temperature properties of oil-based compositions is well known in the art. See for example, page 8 of "Lubricant Additives" by C. V. Smallheer and R. Kennedy Smith (Lezius-Hiles Company Publishers, Cleveland, Ohio, 1967). Pour point depressants useful for the purpose of this invention, techniques for their preparation and their use are described in U.S. Pat. Nos. 2,387,501; 2,015,748; 2,655,479; 1,815,022; 2,191,498; 2,666,748; 2,721,877; 2,721,878; and 3,250,715 which are expressly incorporated by reference for their relevant disclosures.

Anti-foam agents are used to reduce or prevent the formation of stable foam. Typical anti-foam agents include silicone or organic polymers. Additional antifoam compositions are described in "Foam Control Agents", by Henry T. Kerner (Noyes Data Corporation, 1976), pages 125-162.

Detergents and dispersants may be of the ash-producing or ashless type. The ash-producing detergents are exemplified by oil soluble neutral and basic salts of alkali or alkaline earth metals with sulfonic acids, carboxylic acids, phenols or organic phosphorus acids characterized by at least one direct carbon-to-phosphorus linkage. The most commonly used salts of such acids are those of sodium, potassium, lithium, calcium, magnesium, strontium and barium.

The term "basic salt" is used to designate metal salts wherein the metal is present in stoichiometrically larger amounts than the organic acid radical. Basic salts and techniques for preparing and using them are well known to those skilled in the art and need not be discussed in detail here.

Ashless detergents and dispersants are so-called despite the fact that, depending on its constitution, the detergent or dispersant may upon combustion yield a non-volatile residue such as boric oxide or phosphorus pentoxide; however, it does not ordinarily contain metal and therefore does not yield a metal-containing ash on combustion. Many types are known in the art, and any of them are suitable for use in the lubricants of this invention. The following are illustrative:

(1) Reaction products of carboxylic acids (or derivatives thereof) containing at least about 34 and preferably at least about 54 carbon atoms with nitrogen containing compounds such as amine, organic hydroxy compounds such as phenols and alcohols, and/or basic inorganic materials. Examples of these "carboxylic dispersants" are described in British Patent number 1,306,529 and in many U.S. patents including the following:

| | | |
|---|---|---|
| 3,163,603 | 3,381,022 | 3,542,680 |
| 3,184,474 | 3,399,141 | 3,567,637 |
| 3,215,707 | 3,415,750 | 3,574,101 |
| 3,219,666 | 3,433,744 | 3,576,743 |
| 3,271,310 | 3,444,170 | 3,630,904 |
| 3,272,746 | 3,448,048 | 3,632,510 |
| 3,281,357 | 3,448,049 | 3,632,511 |
| 3,306,908 | 3,451,933 | 3,697,428 |
| 3,311,558 | 3,454,607 | 3,725,441 |
| 3,316,177 | 3,467,668 | 4,194,886 |
| 3,340,281 | 3,501,405 | 4,234,435 |
| 3,341,542 | 3,522,179 | 4,491,527 |
| 3,346,493 | 3,541,012 | RE 26,433 |
| 3,351,552 | 3,541,678 | |

(2) Reaction products of relatively high molecular weight aliphatic or alicyclic halides with amines, preferably polyalkylene polyamines. These may be characterized as "amine dispersants" and examples thereof are described for example, in the following U.S. patents:

| | |
|---|---|
| 3,275,554 | 3,454,555 |
| 3,438,757 | 3,565,804 |

(3) Reaction products of alkyl phenols in which the alkyl groups contains at least about 30 carbon atoms with aldehydes (especially formaldehyde) and amines (especially polyalkylene polyamines), which may be characterized as "Mannich dispersants". The materials described in the following U.S. patents are illustrative:

| | |
|---|---|
| 3,413,347 | 3,725,480 |
| 3,697,574 | 3,726,882 |
| 3,725,277 | |

(4) Products obtained by post-treating the carboxylic amine or Mannich dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. patents:

| | | | |
|---|---|---|---|
| 3,036,003 | 3,282,955 | 3,493,520 | 3,639,242 |
| 3,087,936 | 3,312,619 | 3,502,677 | 3,649,229 |
| 3,200,107 | 3,366,569 | 3,513,093 | 3,649,659 |
| 3,216,936 | 3,367,943 | 3,533,945 | 3,658,836 |
| 3,254,025 | 3,373,111 | 3,539,633 | 3,697,574 |
| 3,256,185 | 3,403,102 | 3,573,010 | 3,702,757 |
| 3,278,550 | 3,442,808 | 3,579,450 | 3,703,536 |
| 3,280,234 | 3,455,831 | 3,591,598 | 3,704,308 |
| 3,281,428 | 3,455,832 | 3,600,372 | 3,708,522 |
| | | | 4,234,435 |

(5) Interpolymers of oil-solubilizing monomers such as decyl methacrylate, vinyl decyl ether and high molecular weight olefins with monomers containing polar substituents, e.g., aminoalkyl acrylates or acrylamides and poly-(oxyethylene)-substituted acrylates. These may be characterized as "polymeric dispersants" and examples thereof are disclosed in the following U.S. patents:

| | |
|---|---|
| 3,329,658 | 3,666,730 |
| 3,449,250 | 3,687,849 |
| 3,519,565 | 3,702,300 |

The above-noted patents are incorporated by reference herein for their disclosures of ashless dispersants.

The above-illustrated additives may each be present in lubricating compositions at a concentration of as little as 0.001% by weight usually ranging from about 0.01% to about 20% by weight. In most instances, they each contribute from about 0.1% to about 10% by weight.

The sulfur and copper containing compositions of this invention are employed in lubricating oils in an effective amount to provide antioxidant, extreme pressure and antiwear properties to the lubricant. They are usually employed in a minor amount, relative to the total weight of lubricating composition. Often, they are used at about 0.01 to about 25% by weight, frequently from about 0.1 to about 10% by weight, preferably from about 0.25 to about 5% by weight of the total weight of lubricating composition.

The lubricating oil compositions of the present invention comprise a major amount of oil of lubricating viscosity, including natural or synthetic lubricating oils and mixtures thereof.

Natural oils include animal oils and vegetable oils (e.g. castor oil, lard oil) as well as mineral lubricating oils such as liquid petroleum oils and solvent-treated or acid-treated mineral lubricating oils of the paraffinic, naphthenic or mixed paraffinic-naphthenic types. Oils of lubricating viscosity derived from coal or shale are also useful. Synthetic lubricating oils include hydrocarbon oils and halosubstituted hydrocarbon oils such as polymerized and interpolymerized olefins, etc. and mixtures thereof, alkylbenzenes, polyphenyl (e.g., biphenyls, terphenyls, alkylated polyphenyls, etc), alkylated diphenyl ethers and ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic lubricating oils that can be used. These are exemplified by the oils prepared through polymerization of ethylene oxide or propylene oxide, the alkyl and aryl ethers of these polyoxyalkylene polymers or mono- and polycarboxylic esters thereof, for example, the acetic acid esters, mixed $C_3$-$C_8$ fatty acid esters, or the $C_{13}$Oxo acid diester of tetraethylene glycol.

Another suitable class of synthetic lubricating oils that can be used comprises the esters of dicarboxylic acids (e.g., phthalic acid, succinic acid, alkyl succinic acids, sebacic acid, etc.) with a variety of alcohols (e.g., butyl alcohol, dodecyl alcohol, ethylene glycol, diethylene glycol monoether, etc.).

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another useful class of synthetic lubricants. Other synthetic lubricating oils include liquid esters of phosphorus-containing acids (e.g., tricresyl phosphate, trioctyl phosphate, diethyl ester of decane phosphonic acid, etc.), polymeric tetrahydrofurans and the like.

Unrefined, refined and rerefined oils, either natural or synthetic (as well as mixtures of two or more of any of these) of the type disclosed hereinabove can be used in the compositions of the present invention. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those skilled in the art such as solvent extraction, secondary distillation, hydrorefining, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

Specific examples of the above-described oils of lubricating viscosity are given in Chamberlin III, U.S. Pat. No. 4,326,972 and European Patent Publication 107,282, both of which are hereby incorporated by reference for relevant disclosures contained therein.

As noted hereinabove, the lubricating compositions of this invention include, among others, engine oils and power transmissions fluids, including hydraulic fluids, power shift transmission fluids and automatic transmission fluids. The specific types and characteristics of oils of lubricating viscosity for the various applications are well known in the art.

The compositions of this invention can be added directly to the lubricant. Preferably, however, they are diluted with a substantially inert, normally liquid organic diluent such as mineral oil, naphtha, benzene, toluene or xylene, to form an additive concentrate. These concentrates usually comprise about 0.1 to about 80% by weight of the compositions of this invention and may contain, in addition, one or more other additives known in the art or described hereinabove. Concentrations such as 15%, 20%, 30% or 50% or higher may be employed.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

The following are illustrative examples of the compositions of the present invention. All parts and percentages are parts by weight of the total compositions unless otherwise indicated.

The lubricating compositions of this invention are illustrated by the examples in the following Table I. The lubricating compositions are prepared by combining the specified ingredients, individually or from concentrates, in the indicated amounts and oil of lubricating viscosity to make the total 100 parts by weight.

TABLE I

| Lubricating Oil Compositions | | | | |
|---|---|---|---|---|
| | Examples: Parts by Weight | | | |
| | A | B | C | D |
| Styrene-maleate copolymer post-treated with amine | 0.08 | 0.08 | 0.08 | 0.08 |
| Product of Example 1 | 0.58 | 0.58 | 0.58 | |
| Product of Example 13 | | | | 0.75 |
| Alkylated diphenylamine | | 0.32 | 0.32 | 0.32 |
| Reaction product of alkylene polyamine with polybutenyl (MW about 1700) substituted succininc anhydride | 1.71 | 1.71 | 1.71 | 1.71 |
| Silicone anti-foam | 0.007 | 0.007 | 0.007 | 0.007 |
| Basic sodium sulfonate | 0.30 | 0.30 | 0.30 | 0.30 |
| Copper oleate | | 0.11 | | |
| Copper dialkyl-dithiophosphate | 0.10 | | 0.05 | 0.05 |
| Zinc dialkyl-phosphorodithioate | 0.40 | 0.45 | 0.40 | 0.40 |
| Fatty acid amide | 0.10 | 0.10 | 0.10 | 0.10 |
| Basic magnesium sulfonate | 0.29 | 0.29 | 0.29 | 0.29 |
| Basic calcium sulfonate | 0.28 | 0.28 | 0.28 | 0.28 |

Additive concentrates may be prepared by combining two or more of the various ingredients to be used in the lubricating compositions of this invention. For example, additives listed in Table I, supra, may be combined in the ratios of the numbers presented. As a specific example, copper dialkyldithiophosphate, zinc dialkyldithiophosphate and the product of Example I may be combined in a ratio of 0.10:0.40:0.58 parts by weight. A normally liquid, organic diluent, such as mineral oil, may be added, if desired. As indicated above, such additive concentrates are then combined with an oil of lubricating viscosity to prepare the lubricating compositions of this invention.

What is claim is:

1. A composition comprising from about 1 to about 99 parts by weight of
(A) at least one sulfur compound of the formula:

$$Y-R_1-(S)_n-R_2-Y^1 \qquad (I)$$

wherein $R_1$ and $R_2$ are each independently groups of the formula:

$$-C(R_a)(R_b)- \qquad (II)$$

wherein $R_a$ and $R_b$ are each independently H or hydrocarbyl groups, n is a number from 1 to about 8, Y and $Y^1$ are an electron withdrawing group selected from —CN, —C($R_3$)=$NR_4$, —CON(R)$_2$, —NO$_2$, CH$_2$OH or —COOR, $R_3$ and each R is independently H or a hydrocarbyl group, and $R_4$ is H or a hydrocarbyl group, when both Y and $Y^1$ are —C($R_3$)=$NR_4$, the two $R_4$ groups together may be a hydrocarbylene group linking the two nitrogen atoms, and when Y or $Y^1$ is —CH$_2$OH and the opposite member $Y^1$ or Y is —COOR, a lactone may be formed by intramolecular combination of Y and $Y^1$; and from about 99 to 1 parts by weight of 2. The composition of claim 1 wherein each $R_a$ and $R_b$ is independently H or a hydrocarbyl group and Y and $Y^1$ are —C($R_3$)=$NR_4$ groups wherein each $R_3$ and $R_4$ is independently H or a hydrocarbyl group.

3. The composition of claim 1 wherein both $R_a$ are hydrogen or hydrocarbyl groups, Y is —CH$_2$OH, and $Y^1$ is —COOR wherein R is a hydrocarbyl group.

4. The composition of claim 1 wherein Y and $Y^1$ are NO$_2$, both $R_a$ are hydrocarbyl groups and both $R_b$ are hydrogen.

5. The composition of claim 1 wherein each $R_a$ and $R_b$ is independently H or hydrocarbyl and Y and $Y^1$ are independently —C(O)N(R)$_2$ groups wherein each R is H or a hydrocarbyl group.

6. The composition of claim 1 wherein each $R_a$ and $R_b$ is independently H or hydrocarbyl and Y and $Y^1$ and —CH groups.

7. The composition of claim 1 wherein (B) the oil soluble or dispersible source of copper is at least one member of the group consisting of ionic copper compounds or copper coordination compounds or combinations thereof.

8. The composition of claim 7 wherein (B) the oil soluble or dispersible source of copper is an ionic copper compound.

9. The composition of claim 8 wherein the ionic copper compound is a carboxylate, a dithiocarbamate, a sulfonate, a salt of a mono- or dithiophosphoric acid, a phenate or a xanthate.

10. The compositions of claim 7 wherein (B) the oil soluble or dispersible source of copper is a copper coordination compound.

11. The composition of claim 10 wherein the copper coordination compound is formed by coordination with copper through a sulfur or nitrogen containing ligand.

12. The composition of claim 1 wherein n is an integer from 1 to about 4.

13. The composition of claim 1 wherein $R_a$ and $R_b$ are H or lower hydrocarbyl groups containing from 1 to about 7 carbon atoms.

14. The composition of claim 1 wherein $R_1$ and $R_2$ contain from 3 to about 8 carbon atoms.

15. A lubricating composition comprising an oil of lubricating viscosity and an antiwear and antioxidant effective amount of the composition of claim 1.

16. A lubricating composition comprising an oil of lubricating viscosity and an antiwear and antioxidant effective amount of the composition of claim 7.

17. A lubricating composition according to claim 15 further comprising up to about 0.25% by weight phosphorus as a zinc dithiophosphate.

* * * * *

UNITED STATES PATENT AND TRADEMARK OFFICE
CERTIFICATE OF CORRECTION

PATENT NO.   : 5,171,461
DATED        : December 15, 1992
INVENTOR(S)  : Stephen A. Di Biase and Kirk E. Davis It is certified that error appears in the above-identified patent and that said Letters Patent is hereby corrected as shown below:

Column 22, line 7,

At the end of claim 1, add:

--(B) an oil soluble or dispersible source of copper.--

Signed and Sealed this

Nineteenth Day of September, 1995

Attest:

BRUCE LEHMAN

Attesting Officer

Commissioner of Patents and Trademarks